Aug. 24, 1965
J. B. REICHERT
3,202,738
METHOD OF MAKING FLOOR TILE
Filed Jan. 9, 1962
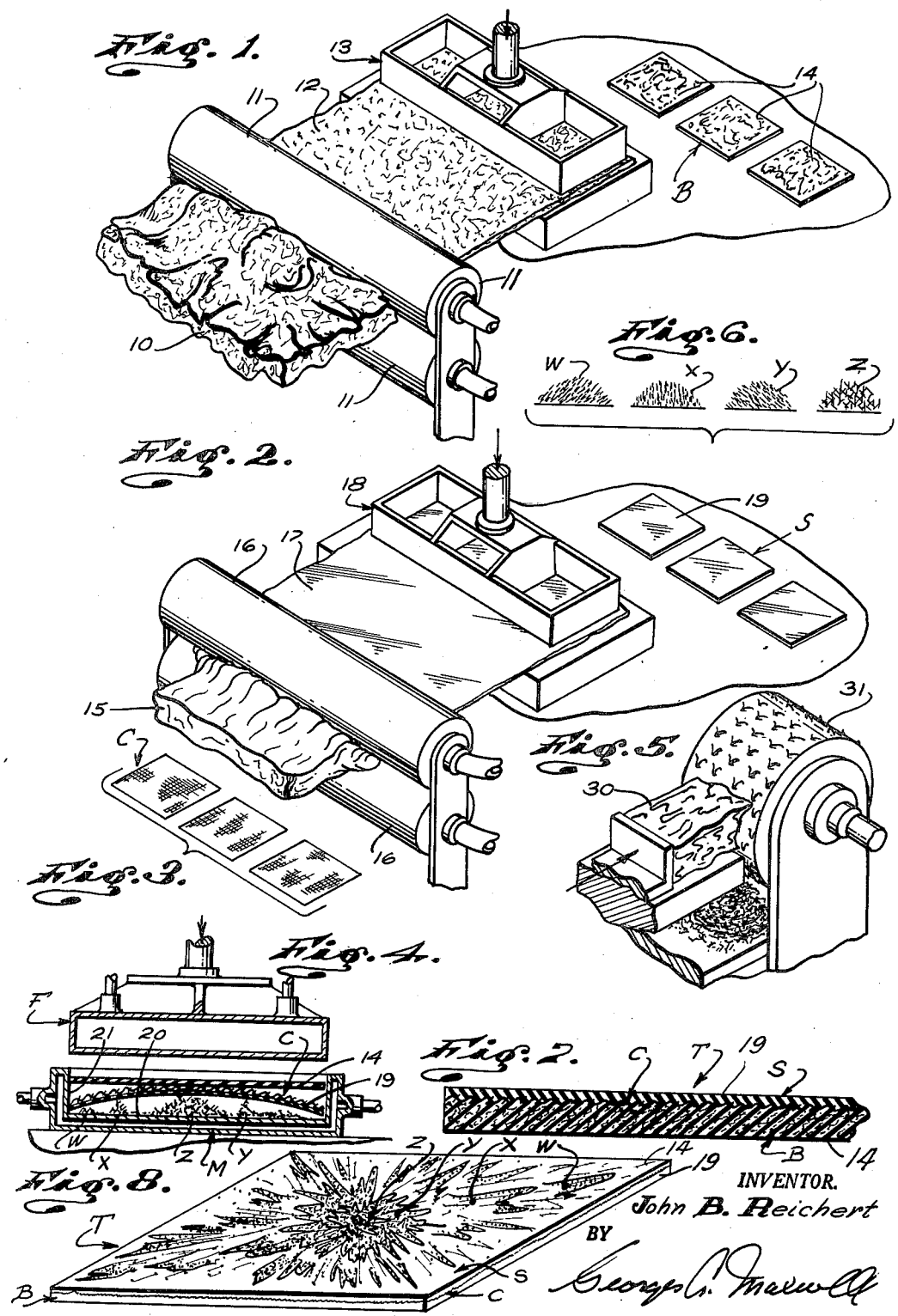
INVENTOR.
John B. Reichert
BY
George C. Maxwell

United States Patent Office 3,202,738
Patented Aug. 24, 1965

3,202,738
METHOD OF MAKING FLOOR TILE
John B. Reichert, 10035 S. Western Ave.,
Los Angeles, Calif.
Filed Jan. 9, 1962, Ser. No. 165,096
8 Claims. (Cl. 264—77)

This invention relates to a novel floor covering and is more particularly concerned with the method of making the same.

An object of this invention is to provide a novel, resilient floor tile.

Another object of this invention is to provide a floor tile of the character referred to constructed with new and reclaimed rubber or synthetic rubber materials.

An object of this invention is to provide a floor tile of the character referred to having a foundation or base layer or lamination of reclaimed waste which is soft and highly resilient, and a top layer or lamination of new material which is tough and durable, having a relatively high Shore hardness and a resulting low memory factor, said base lamination serving to back up and maintain the top layer in proper, desired form.

Yet another object of this invention is to provide a floor tile of the character referred to wherein the new and reclaimed rubber going to make up the tile is separated by a fabric insert or core which the rubber will penetrate, but will not flow through so as to create excessive blending of the new and reclaimed rubber.

A further object of this invention is to provide a resilient rubber or rubber-like floor tile having a fabric core and which is not subject to stretching, warping and working.

Still another object of this invention is to provide a novel method of establishing a polychrome pattern on a rubber floor tile.

It is an object of my invention to provide a novel method of establishing a polychrome pattern on a floor tile wherein the pattern is in the nature of a burst, that is, a pattern wherein the colors flow and radiate outwardly in all directions from the central portion of the tile.

In the art of rubber, plastic, and like constructed floor coverings, it is old to establish a marbelized pattern in or on the surface of the covering. This is accomplished by advancing sheets of uncured base material between calender rolls and by adding small quantities of like material with a desired pigment or of a desired color, on the sheets in a random pattern as the sheets are advanced between the calender rolls. The method of adding color to a sheet of raw uncured material passing between calender rolls unavoidably results in kneading and blending of the dissimilar pigmented materials and achieves an effective marbelized pattern. However, since calendering results in kneading and blending, only two compatible colors of material can be used. Attempts to employ more than two colors, that is, the base color and one additional color, result in a blending of the several colors to such an extent that the end product has a wide range of different shades of the several colors and of blends thereof, and is generally unattractive.

Certain special types of floor coverings of the general character referred to, with many colors therein, have been produced, but this has been accomplished by inserting cured or semi-cured bodies of colored material in the sheets of raw base material. In carrying out such a method, the colored pieces are, in effect, inlaid and no flowing or radiating effect is attained.

Many attempts have been made to establish rubber floor tiles of scrap material from the manufacture of vehicle tire casings, and the like, and from old, worn tire casings, but such attempts have failed and are wanting, since such scrap and reclaimed material is heavily saturated or laden with lamp or carbon black and, as a result, only black tiles or floor coverings can be established therefrom. Still further, due to the presence of cord fibers in reclaimed tire rubber, a smooth, attractive surface cannot be obtained.

Attempts to establish economical and practical floor coverings having heavy bases or foundations of inexpensive reclaimed tire rubber and a thin, decorative, wear resisting skin on top of the foundation formed of new rubber, or rubber-like material, and colored as desired, have failed due, first, to the tendency of the lamp-black laden base to flow, during curing, into the top surface or skin, thereby rendering it defective and, second, due to the differences in elasticity and memory between the two layers, the tendency for the top, harder layer to crack and check when the lower layer yields and stretches.

Many floor coverings have been established with a fabric backing or base to provide the product with sufficient rigidity and to prevent it from stretching. However, no one, to applicant's knowledge, has provided a laminated rubber floor tile, or similar floor covering, with a resilient base or foundation or reclaimed of waste rubber products, a central fabric core, and a hard, durable and wear resisting, decorative top layer of new rubber or rubber-like material, which is less resilient than the base.

Due to the chemical structure of certain tire casing material and due to the chemical structure of certain synthetic rubber products such as neoprene, a satisfactory bond cannot be assured between the two. However, by providing a core of fabric between two such incompatible materials, to which each will bond, a satisfactory connection or union is made and an integrated product is obtained.

The various objects and features of my invention will be fully understood from the following detailed description of a typical preferred form and application of my invention, throughout which description reference is made to the accompanying drawings, in which:

FIG. 1 is a diagrammatic perspective view of certain apparatus provided to carry out certain steps of my new method;

FIG. 2 is a view similar to FIG. 1, showing other apparatus for carrying out other steps of my new method;

FIG. 3 is a perspective view of cores as provided by the present invention;

FIG. 4 is a diagrammatic sectional view of another piece of apparatus for carrying out a step of my new method;

FIG. 5 is a diagrammatic perspective view of additional apparatus for carrying out my new method;

FIG. 6 is a diagrammatic view showing piles or quantities of colored abraded material;

FIG. 7 is a detailed sectional view of a portion of my new tile construction; and FIG. 8 is a perspective view of my new tile construction showing the surface pattern thereof.

The present invention relates to a novel rubber floor tile construction T of new and reclaimed rubber products, and the method of making the same.

The tile T is a laminated structure having a base lamination B of reclaimed and processed tire casing material, a core C of woven fabric and a surface lamination or layer S of new rubber or synthetic rubber product, such as neoprene, G.R.S. (Government Rubber Synthetic) or the like.

In the manufacture of tire casings, a plurality of layers of fabric webbing, saturated or impregnated with raw, uncured rubber and cements, are arranged in molds or about forms, to establish the general configuration of the tire to be formed. Considerable quantities of this webbing are trimmed from the molds or forms, and are reclaimed and processed. The process to which this reclaimed material is subjected consists of milling and/or grinding the trimmings to cut and break up the fibers of the webbing, then pressing the resulting mass of material into large sheets, about one half inch in thickness. These sheets of restored waste are extremely irregular and rough. This reclaimed, processed, waste material is sold at an extremely low price to manufacturers of items such as mud shields to be suspended behind truck tires, and other similar rubber products that need not be neat and clean in appearance, where an attractive finish is not required, and where the product does not come into contact with any object which will be marked and disfigured thereby.

The above limited use for such material is due to the fact that the fiber material in the processed mass prevents the establishment of a product having a smooth, attractive surface, and due to the fact that the rubber is heavily saturated with lamp or carbon black and other impurities such as clays, which make it a rather dirty product to handle and work with, and which readily transfers to, or marks, objects which it comes into contact with.

The above processed waste, or by-product, of tire manufacture, is sold to the general public and is designated by different tire manufacturers by special names or symbols. For instance, Firestone Tire Corporation sells the product under the trademark or designation "L.A.–474".

The first step in carrying out my new method is to clean, as by steaming, a processed sheet 10 of tire casing trimmings, such as L.A.–474, to remove any foreign matter, such as talc, therefrom.

The second step in carrying out my new method involves a pressing or milling of the cleaned processed sheet 10 of tire casing trimmings in a press or between a pair of heated rollers 11, to establish a flat sheet 12 having a uniform thickness of about one-quarter inch, advancing the flat sheet 12 into a cutter 13, which cutter cuts the sheet 12 into squares of the desired dimension and so as to establish blanks 14 for the base laminations B of my new floor tile (see FIG. 1).

The core C of my new rubber floor tile consists of simple, flat, square sheets of suitable woven fabric, such as burlap, linen duck, or fiber glass (see FIG. 3 of the drawings).

The surface layer or lamination S is established of a suitable new rubber or new synthetic rubber product, such as neoprene or G.R.S. (Government Rubber Synthetic). Since there are several suitable products for establishing the surface layer S, I will, in the following description, and for the sake of brevity, restrict myself to neoprene, it being understood that other similar materials can be used without departing from the spirit of the invention.

The next step in carrying out my new method of establishing a rubber floor tile involves establishing a flat sheet of raw neoprene, of desired thickness, for example, from between one-sixteenth and one-eighth inch thick, and then cutting the shet into blanks corresponding in size with the base lamination blanks 14 and the cores C.

The above is accomplished by passing a body 15 of raw neoprene between a pair of heated rollers 16 to establish a flat sheet 17, and then passing the sheet 17 into a cutter 18 which cutter 18 cuts the sheet into blanks 19 for the surface laminations S of my new tile.

The two pieces of apparatus employed to establish the blanks 14 and 19 are alike. Accordingly, the blanks 14 and 19 can, in practice, be established in batches and in separate runs on the same piece of apparatus. Likewise, the cores C can be cut with the same cutter as is employed to cut the blanks.

The neoprene establishing the blanks 19 is suitably pigmented or colored, and is suitably compounded to establish a relatively hard, dense, wear resisting material, which will not readily scratch, crack, or absorb oils, waxes, and the like.

The reclaimed or processed waste material requires considerably more heat to cure it than does the new rubber or neoprene. At 700 p.s.i., the processed waste material must be subjected to about 380° F., to cure, while the neoprene must be subjected to only 260° F. to cure.

It is to be understood that the pressure and temperatures set forth above are only illustrative of the fact that a difference in temperature is required or is desirable in curing the materials employed in carrying out my invention and that in practice, the pressures employed will be considerably greater and that the temperatures required to cure the materials will vary according to their chemical composition or formula, and the pressures to which they are subjected.

The next step in establishing my new rubber floor tile involves placing a blank 19 of neoprene in a heated mold M having a flat, polished bottom 20 and upright side walls 21, arranging a fabric core C on top of the blank 19, arranging a base blank 14 on top of the core, and then urging a heated platen or plunger F having a flat, downwardly-disposed surface, into engagement with the blank 14 and into the mold M. The blanks and the core are then subjected to predetermined pressure and the blank 14 and the blank 19 are each subjected to predetermined temperatures whereby the blanks 14 and 19 are cured and are bonded to the core C.

When the tile has cooked and cured to the desired extent, the plunger S is withdrawn from the mold and the mold is cooled, as by quenching it in a water tank, so as to prevent blistering of the top surface of the tile, and the tile T is then removed from the mold.

The surface lamination S of the basic tile T established in accordance with the above method, is monochrome, or a single color.

To establish a tile T having a polychrome surface, additional steps must be performed, during the above-described method.

The additional steps to establish a tile T having a polychrome surface involve, first, establishing desired quantities of granular or abraded raw neoprene, in various colors. Due to the clay, or gum-like consistency, of raw neoprene, the establishment of the desired quantities of abraded neoprene are established by advancing colored masses 30 of raw neoprene into engagement with a suitable rasping cylinder or drum 31 and collecting the material removed from the mass by the drum into a loose, airy, acervation. By utilizing rasps of varying size and pitch, the average size of the irregular or omniform abraded pieces of neoprene can be controlled. Accordingly, it is to be understood that when I refer to abraded material, I mean to include material sizes throughout a wide range and including what may be referred to as chunks or bits, as well as material that may be referred to as dust or powder.

In FIG. 6 of the drawings, I have diagrammatically illustrated four quantities or piles of abraded neoprene, designated W, X, Y and Z. The piles W, X and Y are loose, airy, acervations of omniform neoprene particles, each of a different color, as indicated by the direction of the lines depicting the piles. The pile Z is a blend of the several colors in the piles W, X and Y, and is a light, airy, agglomeration of the omniform neoprene particles.

The next step required in establishing a tile T having a polychrome surface, is performed prior to the placing of the blank 19 in the mold M, and consists of depositing desired quantities of raw abraded neoprene and of desired colors on the bottom surface 20 of the mold M in random or in predetermined patterns.

The abraded material thus positioned on the bottom surface of the mold, the blank 19 is then placed in the mold, on top of the abraded material, and the process or method previously set forth is carried out.

When the heat and pressure is applied to the assembly in the mold, the colored abraded material softens and the blank 19 softens and permits the colored material to flow. Due to the softened nature of the heated blank 19, flow of the colored material displaces material in the surface of the blank 14 in such a manner that the colored material, in effect, flows into the body of the blank. The material flow in the mold is outwardly from the central portion thereof and towards the sides 12 of the mold, and the natural flow of the abraded material, when pressed down, is outward. As a result of the above, the pattern established by the colored material runs from the central portion of the tile to the sides thereof and gives a polychrome burst effect on the tile surface.

Since the tile is established by vertical pressure alone, and is not milled between rollers and in such a way as to effect working and kneading of the materials, the colored materials do not blend with each other and alter in color, but simply flow. As a result of the above many colors can be advantageously used.

Since the blank 19 is of the same material as the abraded colored material, an integrated mass is established and the colored pattern is within the body of the surface lamination, assuring a lasting and long-wearing patterned surface.

In FIG. 8 of the drawings, I have shown a tile provided by the present invention with a burst-type polychrome pattern in the surface thereof, the different colors of the pattern being designated by the letters W, X, Y and Z, and in accordance with FIG. 6 of the drawings.

In practice, pleasing effects can be accomplished by using abraded material of different size and by blending different colors and different sizes of colored material, as desired.

In practice, the base lamination can be made of a blend of raw tire casing trimmings, as set forth above, and ground or pulverized cured tire casings and/or treads, without departing from the spirit of the invention.

The end product or floor tile T provided by the present invention is a stable, unitary or integrated structure. It is so supported and/or reinforced by the core C that it will not stretch and buckle when installed.

Further, the base lamination B provides a soft, resilient, shock, heat, and moisture insulating foundation for the ornamental surface lamination S. The surface lamination S is such that its Shore hardness can be controlled to provide a durable, wear-resisting surface, and is so supported by the base B that it can readily yield beneath forces exerted thereon and is returned to its original state by virtue of its own memory and by the assistance of the base B.

In practice, the following formula for white neoprene has been successfully employed in carrying out my invention:

| | |
|---|---|
| Neoprene type W | 100 |
| Kralac AEP | 25 |
| Stearic acid | 1.5 |
| Magnesium oxide, light | 4 |
| Zinc oxide, Pasco | 5 |
| Silene EF | 50 |
| Titanium dioxide | 15 |
| Polyethylene | 2 |
| Anti-oxidant 2246 | 1 |
| Di-cup 40C | 4 |

Add 5 parts of any color such as red, blue, green, etc., to the above batch to color.

The following formula for G.R.S. has also been employed with success:

G.R.S. (GOVERNMENT RUBBER SYNTHETIC) FOMULA

| Materials | (Mixes) Final | Volume | RHC |
|---|---|---|---|
| Nevile R-16 | 4.15 | 13.27 | 15.00 |
| Synpol 8214-S-1715 XB | 41.50 | 159.57 | 150.00 |
| Paraffin | 0.42 | 1.67 | 1.50 |
| Stabilite White Powder | 0.62 | 1.97 | 2.25 |
| Suprox-Crown Clay | 70.60 | 98.07 | 255.00 |
| Whiting | 60.60 | 97.32 | 255.00 |
| Titanium Dioxide "A" | 12.45 | 11.39 | 45.00 |
| Zinc Oxide | 2.08 | 1.34 | 7.50 |
| Stearic | 1.04 | 4.41 | 3.75 |
| Santocure | 0.94 | 2.66 | 3.38 |
| DPG | 0.42 | 1.29 | 1.50 |
| Sulfur | 2.49 | 4.50 | 9.00 |

The above formulas are only illustrative of formulas that can be employed in carrying out my invention and are not intended to limit the materials to be employed.

Having described only a typical preferred form and application of my invention, I do not wish to be limited to the specific details herein set forth, but wish to reserve to myself any modifications or variations that may appear to those skilled in the art and fall within the scope of the following claims.

Having described my invention, I claim:

1. The method of making a floor tile including grinding reclaimed tire fabric trimmings saturated with uncured carbon-black laden rubber, compressing the grindings into a flat base sheet, arranging a deposit of abraded virgin rubber of different color over a mold bottom, arranging a flat surface sheet of uncured virgin rubber of uniform color in the mold above the deposits, arranging a flat woven fabric core in the mold above the surface sheet, arranging the base sheet in the mold above the surface sheet, compressing the assembly and subjecting the base sheet to a predetermined temperature to effect curing of the reclaimed rubber and subjecting the deposits and the surface sheet to a predetermined temperature to effect curing of the virgin rubber whereby the said base sheet is cured and bonded directly to the core and whereby said deposits are caused to flow into and across the opposing surface of the surface sheet and said deposits and surface sheet are cured and bonded directly to the core.

2. The method of making a floor tile including grinding reclaimed tire fabric trimmings saturated with uncured carbon-black laden rubber, compressing the regrindings into a flat base sheet, arranging loose heaps of abraded irregularly shaped bits of uncured virgin synthetic rubber material of different colors over a mold bottom, arranging a flat surface sheet of uncured virgin synthetic rubber material of uniform color in the mold above the deposits, arranging a flat woven fabric core in the mold above the surface sheet, arranging the base sheet in the mold above the core, compressing the assembly and subjecting the base sheet to a predetermined temperature to cure the reclaimed rubber and subjecting the deposits and the surface sheet to a predetermined temperature to cure the virgin rubber, whereby the said base sheet is cured and bonded directly to the core and whereby said deposits are caused to flow into and across the opposing surface of the surface sheet and said deposits and surface sheet are cured and bonded directly to the core.

3. The method of making a floor tile including grinding reclaimed tire fabric trimmings saturated with uncured carbon-black laden rubber, compressing the grindings into a flat base sheet, arranging loose heaps of abraded bits of uncured synthetic rubber material of different colors, and loose agglomerations of bits of said abraded material over a mold bottom, arranging a flat surface sheet of uncured virgin synthetic rubber material of uniform color in the mold above the deposits, arranging a flat woven fabric core in the mold above the surface sheet, arranging the base sheet in the mold above the core, compressing the assembly and subjecting the base sheet to a predetermined curing temperature to effect curing of the reclaimed rubber and subjecting the deposits and the surface sheet to a predetermined curing temperature to effect curing of the virgin material, whereby the said base sheet is cured and bonded directly to the core and whereby the said deposits are caused to flow into and across the opposing surface of the surface sheet and said deposits and surface sheet are cured and bonded directly to the core.

4. The method of making a floor tile including, grinding reclaimed tire fabric trimmings saturated with uncured carbon-black laden rubber, compressing the regrindings into a flat base sheet, arranging deposits of abraded uncured virgin rubber of different colors over a mold bottom, arranging a flat sheet of uncured virgin rubber of uniform color in the mold above the deposits, arranging a flat woven fabric core in the mold above the surface sheet, arranging the base sheet in the mold above the core, compressing the assembly and subjecting the base sheet to a predetermined temperature to effect curing of the reclaimed rubber and subjecting the deposits and the surface sheet to a predetermined temperature to effect curing of the virgin rubber whereby the said base sheet is cured and bonded directly to the core and whereby said deposits are caused to flow into and across the opposing surface of the surface sheet and said deposits and surface sheet are cured and bonded directly to the core, said surface sheet establishing a hard, flexible, wear receiving surface, said core being flexible and said base sheet establishing a soft, resilient support for the core and surface sheet, whereby the surface sheet and core normally prevent stretching of the base sheet and said base sheet normally yieldingly maintains the core and the surface sheet in a flat, uniform plane.

5. The method of making a floor tile including, grinding reclaimed tire fabric trimmings saturated with uncured carbon-black laden rubber, compressing the grindings into a flat base sheet, arranging loose heaps of abraded bits of virgin uncured synthetic rubber material of different colors, and loose agglomerations of bits of said abraded material over a mold bottom, arranging a flat surface sheet of uncured virgin synthetic rubber material of uniform color in the mold above the deposits, arranging a flat woven fabric core in the mold above the surface sheet, arranging the base sheet in the mold above the core, compressing the assembly and subjecting the base sheet to a predetermined temperature to effect curing of the reclaimed rubber and subjecting the deposits and the surface sheet to a predetermined temperature to effect curing of the virgin material whereby the said base sheet is cured and bonded directly to the core and whereby said abraded material is caused to flow into and across the opposing surface of the surface sheet and said abraded material and surface sheet are cured and bonded directly to the core, said surface sheet establishing a hard, flexible, wear receiving surface, said core being flexible and said base sheet establishing a soft resilient support for the core and surface sheet, whereby the surface sheet and core normally prevent stretching of the base sheet and said base sheet normally yieldingly maintains the core and the surface sheet in a flat, uniform plane.

6. The method of making a floor tile including grinding reclaimed tire fabric trimmings saturated with uncured carbon-black laden rubber, compressing the grindings into a flat base sheet, abrading different colors of virgin uncured synthetic rubber into bits, arranging and depositing loose agglomerations of said bits over a mold bottom, arranging a flat sheet of uncured virgin rubber of uniform color in the mold above the deposits, arranging a flat woven fabric core in the mold above the surface sheet, arranging the base sheet in the mold above the core, compressing the assembly and subjecting the base sheet to a predetermined temperature to effect curing of the reclaimed rubber and bonding of the base sheet directly to the core and subjecting the deposits and the surface sheet to a predetermined temperature to effect curing of virgin rubber whereby said deposits are caused to flow into and across the opposing surface of the surface sheet and said deposits and surface sheet are cured and bonded directly to the core.

7. The method of making a floor tile including grinding reclaimed tire fabric trimmings saturated with uncured carbon-black laden rubber, compressing the grindings into a flat base sheet, abrading different colors of uncured virgin synthetic rubber into bits, depositing loose agglomerations of said bits over a mold bottom, arranging a flat sheet of uncured virgin rubber of uniform color in the mold above the deposits, arranging a flat woven fabric core in the mold above the surface sheet, arranging the base sheet in the mold above the surface sheet, arranging the base sheet in the mold above the core, compressing the assembly and subjecting the base sheet to a predetermined temperature to effect curing of the reclaimed rubber and bonding of the base sheet directly to the core and subjecting the deposited bits and the surface sheet to a predetermined temperature to effect curing of the virgin rubber, whereby said deposits are caused to flow into and across the opposing surface of the surface sheet and said deposits and surface sheet are cured and bonded directly to the core, said surface sheet establishing a hard, flexible, wear receiving surface, said core being flexible and said base sheet establishing a soft resilient support for the core and surface sheet, whereby the surface sheet and core normally prevent stretching of the base sheet and said base sheet normally yieldingly maintains the core and the surface sheet in a flat, uniform plane.

8. The method of making a floor tile having a polychrome wearing surface including, arranging loose heaps of abraded bits of uncured synthetic rubber material of different colors adjacent one surface of a flat sheet of uncured virgin synthetic rubber material and then pressing said heaps of material and sheet of material at predetermined pressures and at predetermined curing temperatures, whereby said heaps of material are urged into and are caused to flow across the surface of said sheet as the materials are being cured.

References Cited by the Examiner

UNITED STATES PATENTS

| | | | |
|---|---|---|---|
| 1,585,111 | 5/26 | Reichert | 161—166 |
| 1,875,735 | 9/32 | Jackson | 161—84 |
| 2,940,887 | 6/60 | Daly et al. | 161—116 |

EARL M. BERGERT, *Primary Examiner.*